Aug. 7, 1951  W. M. KELLY  2,563,119
RECORDER CHART FOR OIL OR GAS
WELL RECORDING INSTRUMENTS
Filed March 3, 1948
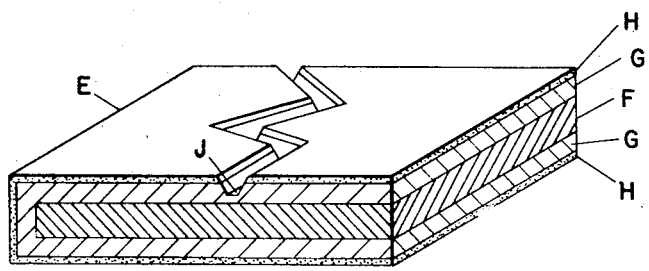
Fig.1
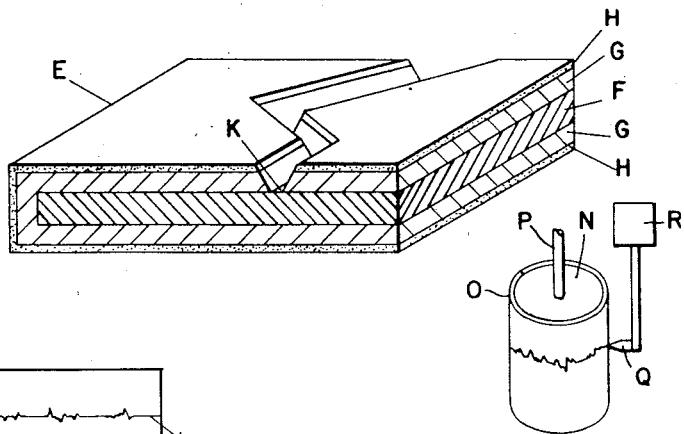
Fig.2
Fig.4
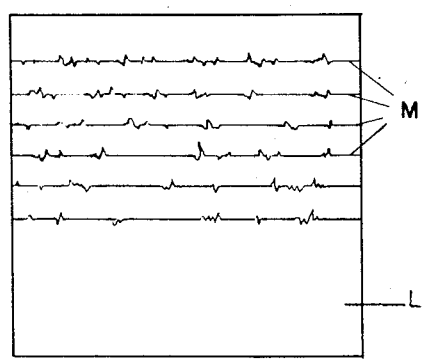
Fig.3
INVENTOR.
WARNER M. KELLY
BY
Busser and Harding
ATTORNEYS Patented Aug. 7, 1951

2,563,119

UNITED STATES PATENT OFFICE 2,563,119

RECORDER CHART FOR OIL OR GAS WELL RECORDING INSTRUMENTS

Warner M. Kelly, Houston, Tex., assignor to Otis Pressure Control, Inc., Dallas, Tex., a corporation of Delaware Application March 3, 1948, Serial No. 12,903

8 Claims. (Cl. 346—77)

This invention relates to recording means for use within oil or gas wells for making measurements of conditions within the well and for recording the same in a form that is durable or permanent and to the chart record so produced.

In the production of oil and gas wells, it is often desirable to determine various conditions prevailing within the well. It is generally desirable, for example, to have information as to the temperatures and pressures occurring within the well not only at the oil or gas reservoir but also at other depths ranging up to the surface. Information of this type is useful in calculating oil and gas reserves, economic rates of production and the like. It is also desirable to have data indicative of the internal condition of the well tubing, in order to reveal whether or not corrosion may have occurred to such extent as to give rise to the danger of a blow-out.

The determination of prevailing well conditions is customarily carried out by lowering a recording instrument into the well. Such instruments usually are arranged to include continuous recording means adapted to make measurements continuously as the instrument is lowered into, or withdrawn from, the well. The recording means may comprise a recorder chart movable within the instrument as the instrument is lowered or raised and a stylus adapted to cooperate with the chart to form markings thereon which are indicative of the well condition being measured. Continuous markings may thus be obtained, which, by suitable correlation with the depth of the instrument in the well, will indicate the condition obtaining at any desired depth.

It is essential to the efficient use of recording instruments of this type that the recorder chart be capable of receiving impressions from the stylus and of retaining the markings received as a permanent record under well conditions. The chart surface should be of such character that it may readily be scratched by the stylus to produce clear, distinct markings indicative of the condition being measured within the well and yet should be tough enough that it will resist scratching when the chart is inserted into or removed from the instrument. It is also generally desirable that the chart surface be of such nature that it may be readily photostated to produce a good reproduction of the chart record.

Materials heretofore proposed for constructing the recorder charts to be used with such instruments have not been generally satisfactory. It has been found that if the chart comes in contact with the well fluids under the well conditions, it is apt to become deleteriously affected and rendered incapable either of properly receiving impressions from the stylus or of retaining the markings received as a permanent record. Particularly is the record apt to be destroyed if the chart is permitted to come in contact with the well fluids at the high temperatures and pressures prevailing in some wells, especially the deeper ones. In some cases temperatures of the order of 300° F. and pressures ranging up to 8000 pounds per square inch or more may be encountered. Under such conditions recorder charts heretofore used have been largely unsatisfactory and generally incapable of withstanding contact of the well fluids without deleterious effect upon the chart record. Various coating materials for the chart surface have been tried, such as inks, lacquers, resins and the like, but these have proved unsatisfactory for general use. These materials usually are not sufficiently insoluble in the well fluids under the more severe conditions encountered in wells. Also, such coating material may be sufficiently porous that gas, under the high pressure of the well, will diffuse into the coating; then, upon removing the recording instrument from the well, the sudden release in pressure will permit expansion of the gas resulting in destruction of the coating layer.

As a means of overcoming these disadvantages, recording instruments have been constructed so that the chart is enclosed within a chart chamber and thus is sealed off from the well fluids. This, however, is also disadvantageous in that it necessitates the use of packing glands which, due to frictional effects, impair the operation of the instrument and greatly reduce its sensitivity.

The present invention provides improved recording means including an improved recorder chart which is capable of functioning in contact with the well fluids under conditions of high temperature and high pressure without any adverse effect on the chart surface. According to the invention, the recorder chart comprises a flexible metal foil backing, a thin electrodeposited intermediate layer of a second metal of hereinafter specified maximum hardness and a surface film of a chemically deposited metal compound inert to well fluids under well conditions and having a contrastingly different appearance from the electrodeposited metal. The electrodeposited metal should be one which is sufficiently soft to be cut into by the stylus of the recording instrument, thus producing markings which are contrasting in appearance with the chemically deposited surface film. To meet this requirement the electrodeposited metal should have a Brinell hardness less than about 60. Examples of suitable metals are cadmium, gold, platinum, tin, zinc and lead, cadmium being especially suitable for the purpose. Those metals which have a Brinell hardness less than 60 but which are incapable of being electrodeposited from aqueous solution, such as the alkali or alkaline earth metals, are, of course, inoperative. The desired thickness of the electrodeposited layer will depend upon the hardness of the particular metal used and the tension of the recorder stylus against the chart but generally may be within the range of 0.00001–0.02 inch.

The metal foil backing preferably should be composed of a relatively hard metal such as plain steel, stainless steel, Monel metal, copper, brass or the like. However, softer metals such as silver or tin may be employed as the backing, if desired, provided they are used in sufficient thickness.

In a preferred embodiment of the invention, the recorder chart comprises a flexible metal foil backing, a thin electrodeposited intermediate layer of cadmium and a surface film of basic chromium chromate containing both hexavalent and trivalent chromium. This surface film may be formed by treating the surface of the electrodeposited cadmium with a treating solution as hereinafter described. The chromium chromate film so produced will have a color or appearance sharply contrasting with that of the cadmium or of the metal foil backing. When the chart is used in the recording instrument, the stylus of the instrument will scratch through the surface film into the cadmium, thereby forming grooved markings which are readily visually distinguishable from the surface film. The used chart will constitute a permanent and durable record of the conditions measured within the well. One particular advantage of this embodiment of the invention is that the used chart may be easily photostated by conventional photostatic means, thereby readily reproducing the record obtained.

The preferred form of recorder chart may be prepared by first subjecting a metallic foil backing, preferably a steel foil, to any conventional or suitable treatment for forming, by electrodeposition, a thin layer of metallic cadmium on the surface or face of the foil. The thickness of the cadmium layer may vary considerably. Generally it is desirable that it have a thickness within the range of 0.0001–0.02 inch and preferably of the order of 0.001 inch. After deposition of the cadmium it is preferably polished, for example by rubbing lightly with finely divided pumice, to produce a smooth, satin-like finish. The polished surface is then subjected to treatment with a solution adapted to form a deposit of the desired basic chromium chromate as a thin surface film. The treatment of a metal surface to form a film of this type is known and has been described in an article entitled "The Cronak Process as Applied to Zinc Plate" by S. E. Maxon appearing at pages 148–149 of Metal Finishing, vol. 43, No. 4, April 1945. Such treatment has heretofore been used for rendering the surface of a metal non-corrosive, and has been applied in the manufacture of such articles as cartridge cases, carburetors, fuel pumps, radio parts, aircraft parts, locks, telephones, slide fasteners and the like. The treating solution employed comprises an aqueous solution of a chromium compound, such as sodium or potassium dichromate or chromic acid, and a mineral acid such as sulphuric, hydrochloric or nitric acid. The proportions of such compounds in the treating solution may vary considerably. One typical procedure for carrying out the treatment comprises immersing the chart for one minute in a solution containing 188 grams of sodium dichromate and 7 cubic centimeters of sulphuric acid per liter of solution. Such treatment will cause formation of a copper-colored film of the desired chromate compound on the cadmium layer.

The thus prepared chart will have a smooth copper-colored surface which is readily capable of being scratched by the recorder stylus to produce markings of a permanent and legible character. When the chart is used in a recording instrument, the stylus point will penetrate through the copper-colored film into the subjacent metallic cadmium layer or in some cases to the surface of the steel foil backing. This will result in a chart record comprising lines of light color against a copper-colored background, which may readily be reproduced by photostatic means to yield a clear and distinct photostat composed of black lines on a white background. The chromium chromate coating is non-porous and is unaffected by oil, gas and water even under the most severe conditions of temperature and pressure encountered in wells. It is sufficiently tough that it will resist scratching during normal handling of the chart in inserting it into, and removing it from, the recorder instrument, and yet is capable of readily receiving markings from the stylus to form thin sharp lines having no tendency to flake at the edges. The used chart will constitute a durable and permanent record of the well conditions measured.

In the accompanying single sheet of drawings, Figs. 1 and 2 are perspective views, in section, illustrative of portions of the chart after use in a recording instrument. Fig. 3 illustrates the appearance of a negative photostatic copy of the chart containing a record of the well conditions measured. Fig. 4 illustrates a recording device including the recorder chart in cooperation with a stylus and means for exerting sufficient pressure by the stylus on the chart surface to scratch through an outer layer of the chart.

Referring to Fig. 1, the edge "E" constitutes an outer edge of a chart composed of a metal foil backing "F" such as steel, an intermediate electrodeposited layer "G" of a second metal having a Brinell hardness less than 60 such as cadmium, and a surface film "H" of a metal compound which is inert to well fluids under well conditions and which has an appearance contrasting with that of the underlying layer "G." An example of the surface film "H" is basic chromium chromate formed in the manner above-described. A grooved marking indicative of the well condition measured has been formed on the chart by applying sufficient pressure to the chart surface by the recorder stylus to cause it to penetrate through the surface film and into the intermediate layer as shown at "J," thereby exposing the electrodeposited metal at the base of the groove.

Fig. 2 illustrates the same type of chart as shown in Fig. 1 (the same lettering being used to designate identical parts), but in this case sufficient pressure has been applied by the stylus to cause it to scratch not only through the surface film "H" but also through the electrodeposited layer "G," thereby exposing the metal backing at the base of the groove as indicated at "K."

While in Figs. 1-2 the thickness of the chart has been greatly enlarged, it is to be understood that the chart is sufficiently thin to be flexible so that it may readily be bent for reception by the chart cylinder or chamber of a recording instrument.

In Fig. 3 "L" corresponds to the face of the used chart upon which grooved markings "M," indicative of the conditions measured within a well, have been made by the stylus of the recording instrument. A negative photostatic copy of the chart will appear as black lines against a white background, as illustrated in Fig. 3.

The recording device shown in Fig. 4 includes a chart-receiving cylinder or drum "N" carrying chart "O." The chart may be fixed to the surface of the cylinder in any suitable manner. A drive shaft "P" is connected to cylinder "N" to cause it and the chart to rotate as the recording device is passed through the well. A stylus "Q" is positioned in cooperation with the chart and is caused to press against the chart surface by mechanism, diagrammatically illustrated at "R," adapted to exert sufficient pressure by the stylus to scratch through an outer layer of the chart. The pressure-applying mechanism "R" is not shown in detail, as any known means suitable for this purpose may be employed, for example, spring means having sufficient tension to cause the stylus to cut through the outer layer of the chart.

This application is a continuation-in-part of my co-pending application, Serial No. 709,431, filed November 13, 1946, now abandoned.

Having described my invention, what I claim and desire to protect by Letters Patent is:

1. A recorder chart for use with an oil or gas well recording instrument having a stylus and means for exerting sufficient pressure by the stylus against the chart to scratch through an outer layer of the chart and form grooved markings thereon of contrasting appearance with the chart surface and indicative of conditions measured within the well, which chart comprises a flexible sheet metal foil backing, a thin electrodeposited intermediate layer of another metal having a Brinell hardness less than 60 and a chemically deposited surface film of a metal compound inert to well fluids under well conditions and having an appearance visually contrasting with the underlying electrodeposited metal.

2. A recorder chart for use with an oil or gas well recording instrument having a stylus and means for exerting sufficient pressure by the stylus against the chart to scratch through an outer layer of the chart and form grooved markings thereon of contrasting appearance with the chart surface and indicative of conditions measured within the well, which chart comprises a flexible sheet metal foil backing selected from the group consisting of plain steel, stainless steel, Monel metal, copper and brass, a thin electrodeposited intermediate layer of another metal selected from the group consisting of cadmium, gold, platinum, tin, zinc and lead and a chemically deposited surface film of a metal compound inert to well fluids under well conditions and having an appearance visually contrasting with the underlying electrodeposited metal.

3. A recorder chart for use with an oil or gas well recording instrument having a stylus and means for exerting sufficient pressure by the stylus against the chart to scratch through an outer layer of the chart and form grooved markings thereon of contrasting appearance with the chart surface and indicative of conditions measured within the well, which chart comprises a flexible sheet steel foil backing, a thin electrodeposited layer of cadmium and a chemically deposited surface film of a metal compound inert to well fluids under well conditions and having an appearance visually contrasting with the underlying cadmium.

4. A recorder chart for use with an oil or gas well recording instrument having a stylus and means for exerting sufficient pressure by the stylus against the chart to scratch through an outer layer of the chart and form grooved markings thereon of contrasting appearance with the chart surface and indicative of conditions measured within the well, which chart comprises a flexible sheet steel foil backing, a thin electrodeposited intermediate layer of cadmium and a surface film of basic chromium chromate containing both hexavalent and trivalent chromium.

5. A recording device for use within an oil or gas well for recording measurements of conditions therein which comprises a recorder chart comprising a flexible sheet metal foil backing, a thin electrodeposited layer of another metal having a Brinell hardness less than 60 and a chemically deposited surface film of a metal compound inert to well fluids under well conditions and having an appearance visually contrasting with the underlying electrodeposited metal, and a well recording instrument carrying said chart and having a stylus in cooperation therewith and means for exerting sufficient pressure by the stylus against the chart to scratch through an outer layer of the chart and form grooved markings thereon of contrasting appearance with the chart surface and indicative of conditions measured within the well.

6. A recording device as defined in claim 5 in which the metal foil backing is selected from the group consisting of plain steel, stainless steel, Monel metal, copper and brass and the electrodeposited layer is selected from the group consisting of cadmium, gold, platinum, tin, zinc and lead.

7. A recording device as defined in claim 5 in which the recorder chart comprises a steel foil backing, a thin electrodeposited intermediate layer of cadmium and a chemically deposited surface film of a metal compound inert to well fluids under well conditions.

8. A recording device for use within an oil or gas well for recording measurements of conditions therein which comprises a recorder chart comprising a flexible sheet steel foil backing, a thin electrodeposited intermediate layer of cadmium and a surface film of basic chromium chromate containing both hexavalent and trivalent chromium, and a well recording instrument carrying said chart and having a stylus in cooperation therewith and means for exerting sufficient pressure by the stylus against the chart to scratch at least through said surface film and form grooved markings on the chart of contrasting appearance with the surface film and indicative of conditions measured within the well.

WARNER M. KELLY.

REFERENCES CITED

The following references are of record in the file of this patent:

UNITED STATES PATENTS

| Number | Name | Date |
|---|---|---|
| 1,336,090 | Schaub | Apr. 6, 1920 |
| 1,383,174 | Udy | June 28, 1921 |
| 1,383,175 | Udy | June 28, 1921 |
| 1,383,176 | Udy | June 28, 1921 |
| 1,726,126 | Scheppmann | Aug. 27, 1929 |
| 2,099,725 | De Forest | Nov. 23, 1937 |
| 2,137,307 | Rabald | Nov. 23, 1938 |
| 2,148,225 | Zecha | Feb. 21, 1939 |
| 2,314,244 | Pratt | Mar. 16, 1943 |

OTHER REFERENCES

Metal Finishing, vol. 43, #4, pages 148–9, April 1945. Copy in Scientific Library.